(12) United States Patent
Nordhoff

(10) Patent No.: US 6,641,366 B2
(45) Date of Patent: Nov. 4, 2003

(54) WIND POWER GENERATING SYSTEM WITH AN OBSTRUCTION LIGHTING OR NIGHT MARKING DEVICE

(76) Inventor: Thorsten Nordhoff, Bismarckstrasse 63, 27570 Bremerhaven (DE)

( * ) Notice: Subject to any disclaimer, the term of this patent is extended or adjusted under 35 U.S.C. 154(b) by 0 days.

(21) Appl. No.: 10/057,438

(22) Filed: Jan. 25, 2002

(65) Prior Publication Data

US 2002/0102161 A1 Aug. 1, 2002

(30) Foreign Application Priority Data

Jan. 26, 2001 (DE) .......................... 101 03 387

(51) Int. Cl.[7] .............................................. F03D 11/00
(52) U.S. Cl. ................... 416/5; 416/61; 416/146 R; 416/224; 416/230
(58) Field of Search ................... 416/5, 146 R, 416/224, 230, 61; 290/44, 55

(56) References Cited

U.S. PATENT DOCUMENTS

| 3,701,498 A | * | 10/1972 | Ferrara ................. 244/17.11 |
|---|---|---|---|
| 3,723,722 A | * | 3/1973 | Van Iderstine et al. ..... 362/470 |
| 5,401,138 A | * | 3/1995 | Mosiewicz ................. 416/226 |
| 6,175,354 B1 | * | 1/2001 | Blissett et al. .............. 345/110 |

FOREIGN PATENT DOCUMENTS

| DE | 93 02 798.2 | 2/1993 |
|---|---|---|
| DE | 298 20 809 | 11/1998 |
| DE | 299 20 736 | 11/1999 |
| DE | 200 08 289 | 5/2000 |
| DE | 200 15 183 | 9/2000 |
| JP | 411132409 A | * 7/1999 |

* cited by examiner

Primary Examiner—Ninh H. Nguyen
(74) Attorney, Agent, or Firm—Collard & Roe, P.C.

(57) ABSTRACT

A wind power generating system with an obstruction lighting or night marking device, and with at least one rotor blade allocated to a rotor hub which exhibits at least one optical waveguide, which is routed from the rotor blade hub-side end area to the rotor blade surface, and that a light source is allocated to the optical waveguide in the rotor blade hub-side end area.

16 Claims, 5 Drawing Sheets

WIND POWER GENERATING SYSTEM WITH AN OBSTRUCTION LIGHTING OR NIGHT MARKING DEVICE

BACKGROUND OF THE INVENTION

1. Field of the Invention

The invention relates to a wind power generating system with an obstruction lighting or night marking device, and with at least one rotor blade allocated to a rotor hub.

2. The Prior Art

All tall buildings constitute potential sources of danger for air traffic. To prevent accidents, tall buildings are fitted with obstruction lighting or night markings for air traffic during poor visibility, in particular for air traffic in darkness. Due to their structural height, wind power generating systems are also included among the potential sources of danger for air traffic, and must therefore be fitted with obstruction lighting or night markings.

To attain maximum safety, it is critical that the obstruction lighting or night marking device be located as close to the highest point of a building as possible, but preferably at a height where the obstruction lighting or night marking device itself constitutes the highest point of the building.

DE 200 08 289 and DE 200 15 183 U1 are wind power generating systems with an obstruction lighting or night marking device. They have electric lamps arranged in the respective hazard area.

Publication G 93 02 798.2 U1 describes an obstruction light used as a warning device for air traffic, whose light outlet element is connected to a light source a distance away by means of an optical waveguide bundle and optical aids. The light outlet element is secured to an airport, electrical tower, chimney, or telecommunications tower, and is designed as a rotationally symmetric carrier with an all-around radiation characteristic.

However, the arrangement of such obstruction lighting or night marking devices in wind power generating systems has proven to be problematic, since the highest point is located at the outer end of the turning rotor blade. The problem lies in the requirement for an overall low-maintenance power supply to the lamps situated on the turning rotor blades, and also in the attachment of the lamps or light outlet elements on the rotor blade so as to minimize the impact of the load and aerodynamics of the individual rotor blades.

There is an increased risk of lightning strikes for electrical devices located in or on the rotor blades. In addition, the supply of electrical current to lamps located on or in the rotor blades requires either the use of high-maintenance loop contacts between the rotor fixture and a rotor pivoted in the rotor fixture, or the arrangement of accumulators on the rotor. However, the latter are conceivably unsuitable for placement on or in the rotor blades given their relatively high weight. In addition, replacing spent accumulators would require shutting off the rotor every time.

SUMMARY OF THE INVENTION

An object of the invention is to create a wind power generating system whose rotor blades have an efficiently operating obstruction lighting or night marking device.

The wind power generating system provides a rotor blade having at least one optical waveguide, routed from the rotor blade hub-side end area to the rotor blade surface. A light source is provided for the optical waveguide in the rotor blade hub-side end area.

This design enables the transfer of light waves from the rotor blade hub-side end area to any region of the rotor blade. One advantage to the light source being located in the rotor blade hub-side end area is that the light source can be simultaneously used for each individual rotor blade. The light source can either be located on the rotor itself, or on non-rotating machine parts of the tower head. The advantage to the latter is that no loop contacts, rotary contacts or accumulators are required for supplying electrical power to the rotor.

It is essential that the optical waveguide is routed through the interior of the rotor blade so as not to adversely impact the aerodynamic flow conditions on the flow profile.

In a further development of the invention, the optical waveguide is designed as a fiber optical cable. Such optical cables have a bundle of flexible optical fibers, which are protected and held together by a plastic sheath. The optical cables consisting of glass fibers are used in many areas of technology, the advantage of which is that a wide range of optical cables are available on the market.

In another further development of the invention, the optical cable exhibits at least one split point, in which the optical fiber bundle is split into partial bundles toward the rotor blade surface. This design makes it possible to route the optical waveguides in various partial areas of a rotor blade. The split point is preferably located at the rotor blade tip, since this area constitutes the maximum height of the wind power generating system as the rotor turns, and so is the most important in terms of obstruction lighting.

In addition, a system for influencing the light beams is provided at each end of the partial optical fiber bundle lying in the rotor blade surface. This system aligns and orders the waves of light diffusely exiting the optical fibers into beams of light with a scattering and radiating direction that can be preset. The light beam influencing system preferably exhibits mirrors or prisms. The light beams can be influenced in nearly any manner desired by combining the mirrors and prisms.

With the framework of the invention, the light beam influencing system can be made as complex as possible, e.g., to achieve particularly effective lighting effects on the rotor blades that rotate at various speeds.

In a further development of the invention, the rotor blade exhibits a hollow body profile, which consists of at least one web running in a radial direction, and a belt enveloping the web and forming the rotor blade surface. Since particularly large wind power generating systems require obstruction lighting and night marking devices, the hollow body profile offers various ways to install or arrange the optical cable in the rotor blade. For example, the optical cable can be routed alongside the inner surfaces of the hollow body profile. It is also conceivable for the optical cable to be integrated into the web or belt. This integration can be part of the manufacturing process of a rotor blade, and protects the optical cables in the rotor blade. In addition, it is possible to design webs and belts wholly or partially out of fiberglass-reinforced plastics with light guiding properties.

The light source is preferably situated on non-rotating, fixed machine parts of the tower head, so that the hub-side end areas of the rotor blades rotate around this fixed, stationary light source. Thus, the light-absorbing surfaces are preferably arranged at the hub-end areas of the rotor blades, and connected with the optical waveguides in the rotor blades.

In a particularly advantageous configuration of the invention, the obstruction lighting or night marking device has a controller for controlling the light source. The controller offers another way of achieving useful effects on the rotating rotor blades. For example, the light source can also have a light wavelength-changing device, which controls various light colors. In another embodiment the light source can have a projector to project images, and have the images transfered to an advertising space integrated in the rotor blade surface by way of an optical fiber strand. The advertising area here consists of numerous light points, wherein at least one optical fiber is used for each light point. These advertising areas include advertising slogans or lettering in the form of brand names. One important advantage has to do with shortening the payback time for these wind power generating systems through advertising revenue.

In a further development of the invention, the rotor blades are designed so that even older wind power generating systems can be retrofitted with them. Rotor blades adjusted for these wind power generating systems provides another essential aspect of the invention.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
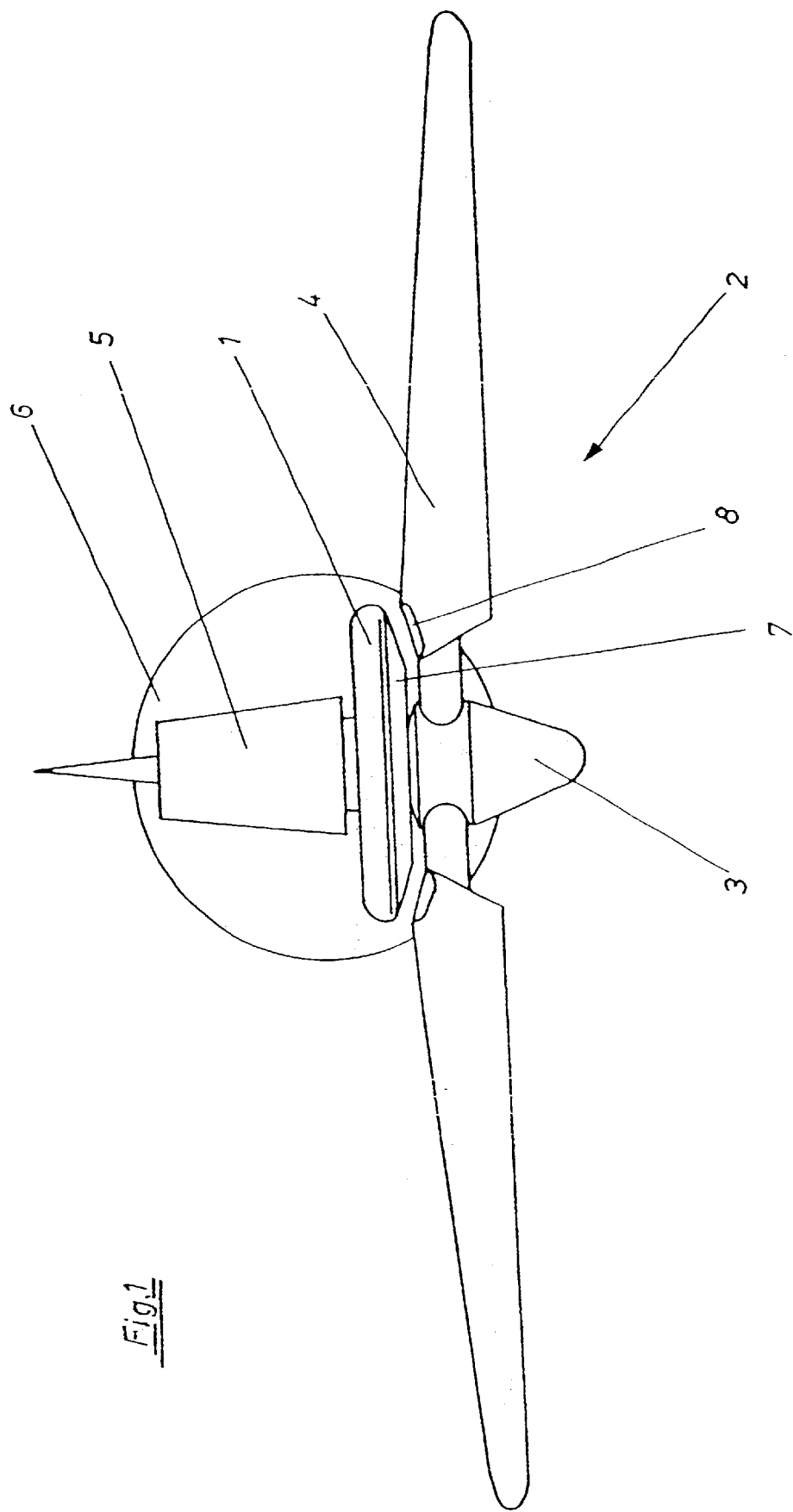
FIG. 1 is a top view of a wind power generating system according to the invention.

Referring now in detail to the drawings and, in particular, FIG. 1 shows a top view of a wind power generating system according to the invention with a lighting system 1 for obstruction lighting or night marking, and with a rotor 2 comprised of three rotor blades 4 connected to a rotor hub 3. Rotor 2 forms the drive of a generator arranged in a generator 5. The casing of generator 5 is coupled to a tower 6. One ring-shaped lighting system 1 is situated on a main shaft between rotor 2 and generator 5. Lighting system 1 along with its also ring-shaped light source 7 is centrally located on the main shaft. The hub-side end area of each rotor blade 4 exhibits a light-absorbing surface 8 that is provided for ring-shaped light source 7. It is important that couplings be used on lighting system 1, which couple it either to the casing of generator 5 statically at rest, or to turning rotor 2. As a result, light-absorbing surfaces 8 run along ring-shaped light source 7 tracing a circuitous route, or light-absorbing surfaces 8 are allocated to a specific area of the ring-shaped light source 7.

Figure 2:
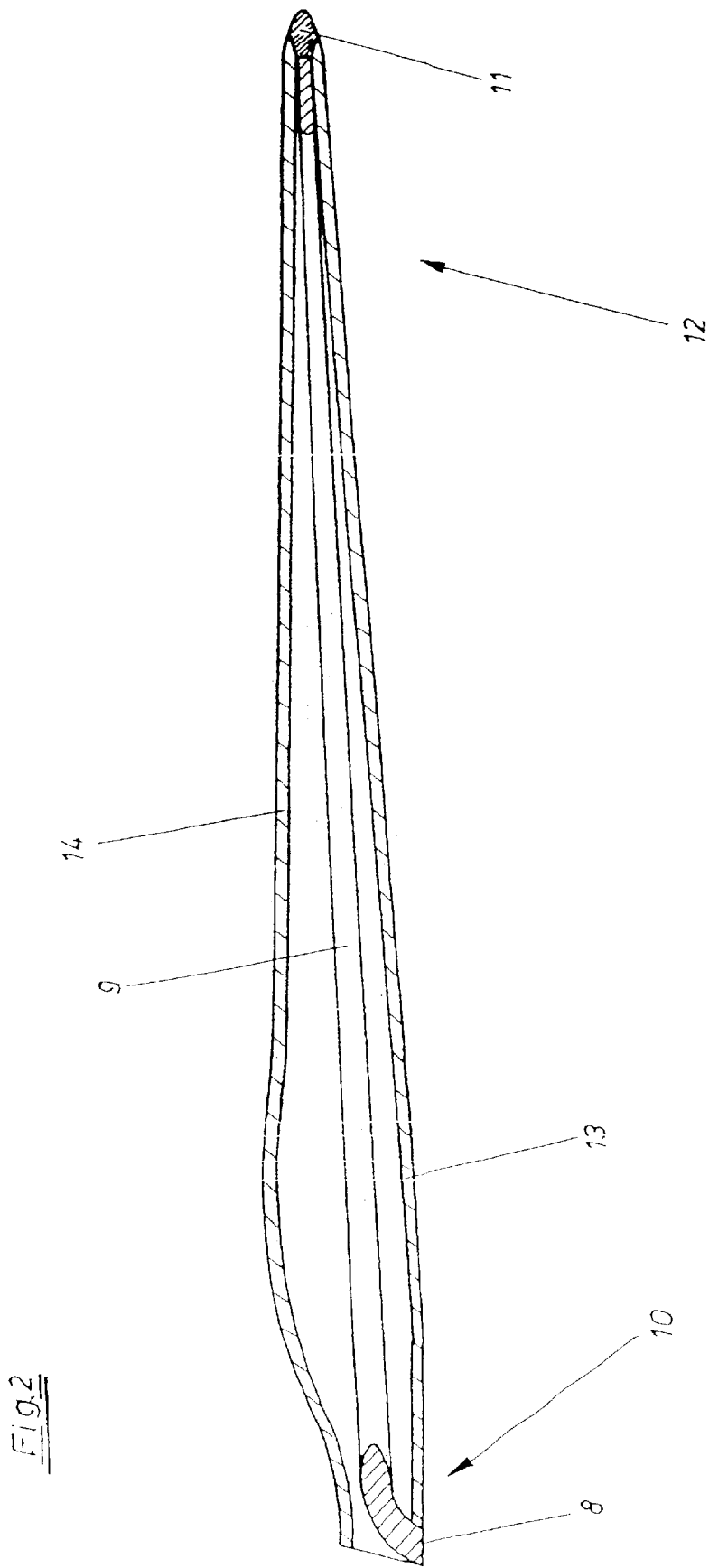
FIG. 2 is a longitudinal section viewed along the A—A line (see FIG. 3) of a rotor blade of the wind power generating system according to the invention.

FIG. 2 shows a longitudinal section along the A—A line (see FIG. 3) of a rotor blade of the wind power generating system according to the invention. An optical cable 9 is routed from a hub-side area 10 along a rotor blade edge 11 and into a rotor blade tip 12. Rotor blade edge 11 is made by butting together a lower belt 13 with an upper belt 14. The end of optical cable 9 lying in hub-side 10 has light-absorbing surface 8. Rotor blade edge 11 is preferably made out of a material with transparent properties. Optical cable 9 is connected to rotor blade edge 11 in such a way that light waves from optical cable 9 can get through rotor blade edge 11 having transparent properties and into the free space. Rotor blade edge 11 preferably acts as a mirror and/or prism, thus radiating the light exiting diffusely from optical cable 9 into the free space in a predetermined direction and scattering.

Figure 3:
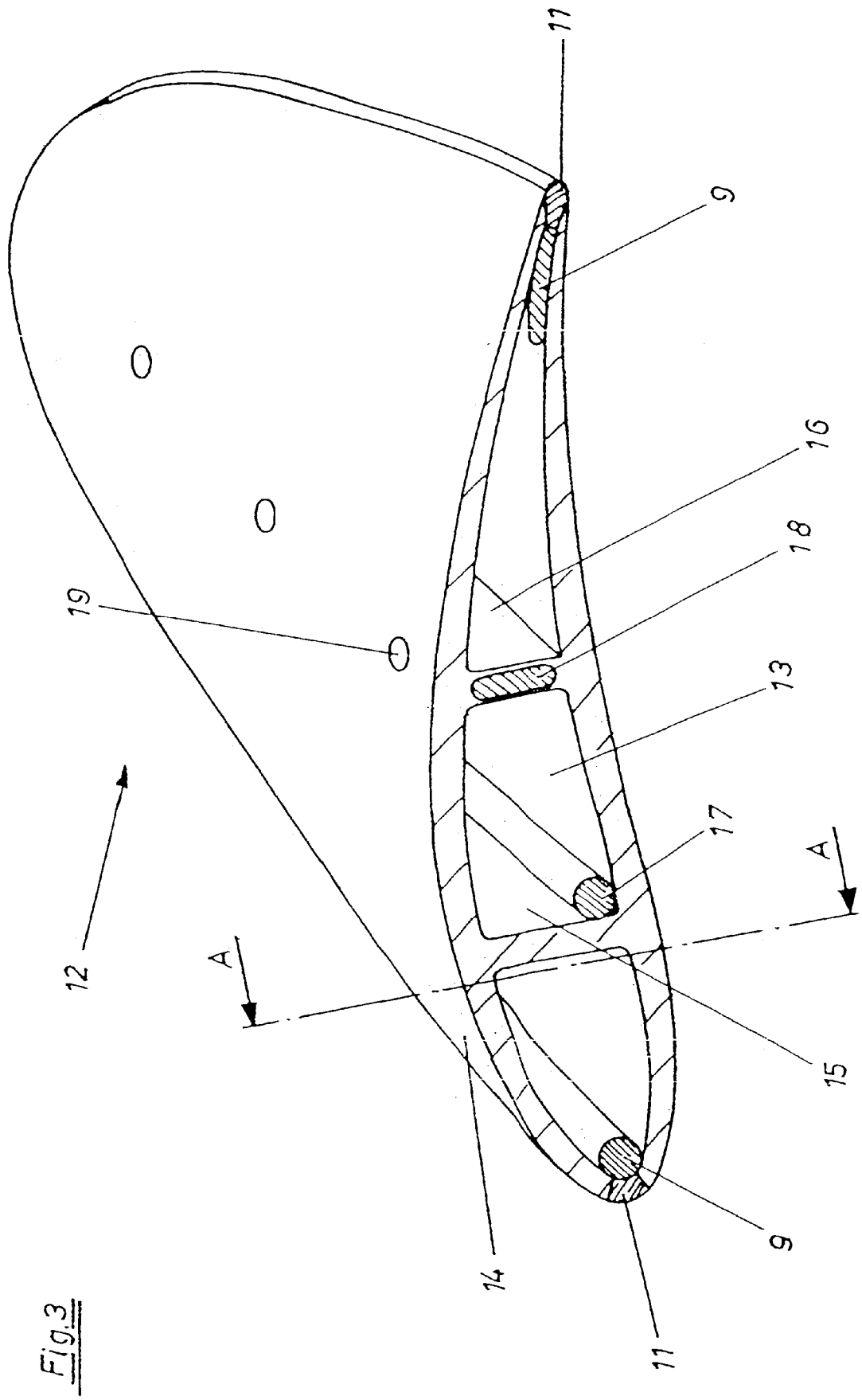
FIG. 3 is a perspective view of a transversely cut rotor blade tip of the wind power generating system having a hollow body and interior webs.

FIG. 3 shows a perspective view of a transversely cut rotor blade tip of the wind power generating system according to the invention based on a first embodiment. The rotor blade tip has a rotor blade profile with a front web 15 and a back web 16, which link lower belt 13 with upper belt 14. Optical cable 9 is connected to rotor blade edge 11 with the transparent properties. A second optical cable 17 is located in the inner edge between lower belt 13 and front web 15. Second optical cable 17 situated in this way is preferably provided to supply the outer surfaces of lower belt 13 or upper belt 14.

Back Web 16 has a third optical cable 18 integrated into it. The advantage of integrating third optical cable 18 into the rotor blade profile is that this keeps it protected and fixed in place. The areas to be illuminated by third optical cable 18 are preferably also the outer surfaces of belts 13, 14.

In order to illuminate sections of belts 13, 14 comprising the rotor blade surface, the latter have transparent elements 19, to which are connected a respective portion of the optical fibers comprising an optical cables 9, 17, 18. Transparent elements 19 preferably act as a mirror and/or prism, converting the diffuse light from optical cables 9, 17, 18 into ordered beams of light with a preset direction, divergence and scattering.

Figure 4:
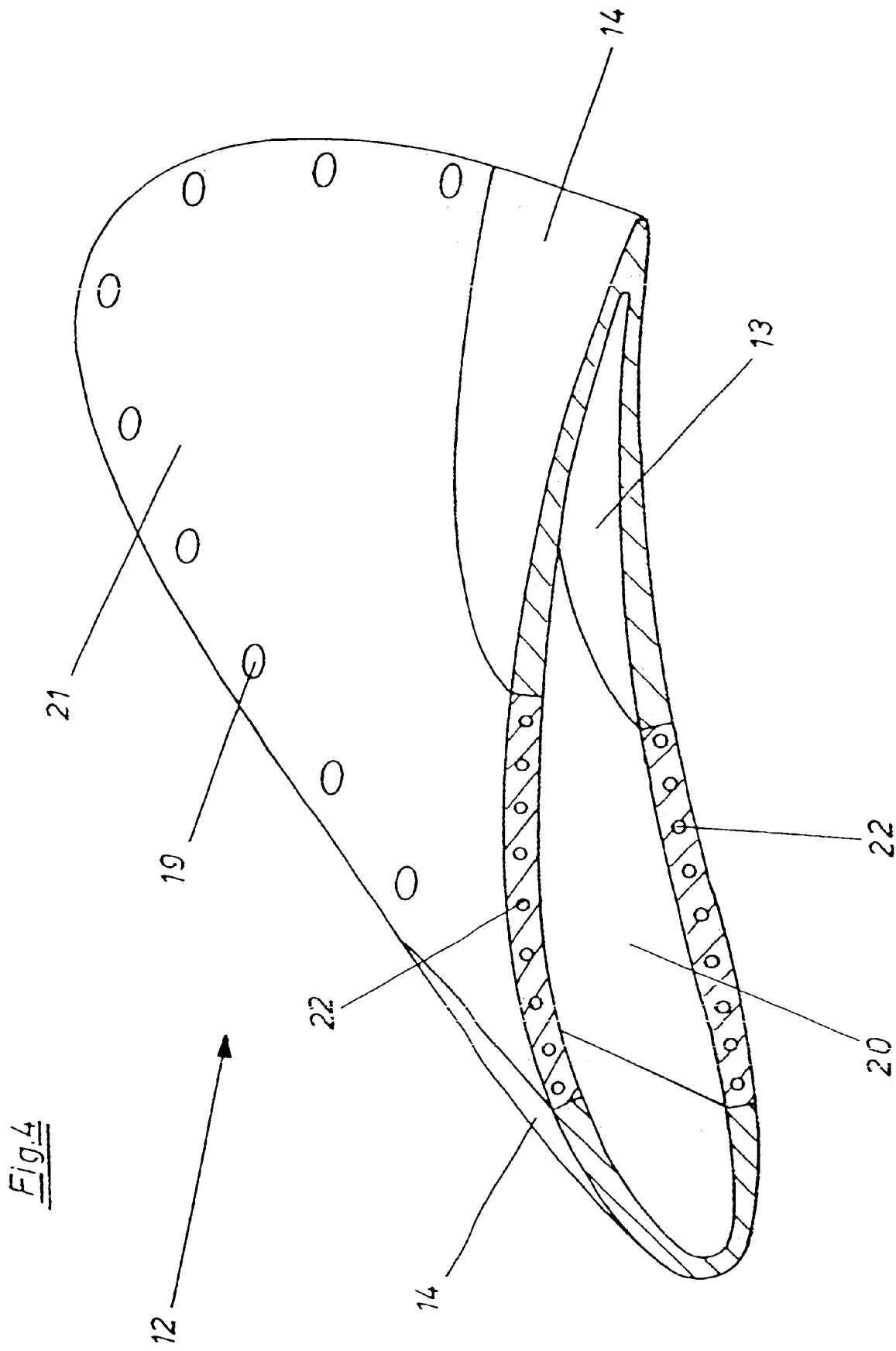
FIG. 4 is a perspective view of a transversely cut rotor blade tip of the wind power generating system having optical bundles integrated into the body.

FIG. 4 shows a perspective view of a transverse-cut rotor blade tip of the wind power generating system according to a second embodiment. Rotor blade tip 12 has two insertion areas 20, 21. Lower insertion area 20 is part of lower belt 13, while upper insertion area 21 is part of upper belt 14. Insertion areas 20, 21 have partial optical fiber bundles 22 integrated into their composite fiber material. Each partial optical fiber bundle 22 leads to a transparent element 19, which is situated in the surfaces of insertion areas 20, 21. Integrated partial optical fiber bundles 22 result from an interface arranged in the front area of the rotor blade, in which a large optical cable splits into several partial optical fiber bundles. The optical fibers of each integrated partial optical fiber bundle 22 are preferably allocated to a defined area of light-absorbing surface 8 (see FIGS. 1 and 2).

Figure 5:
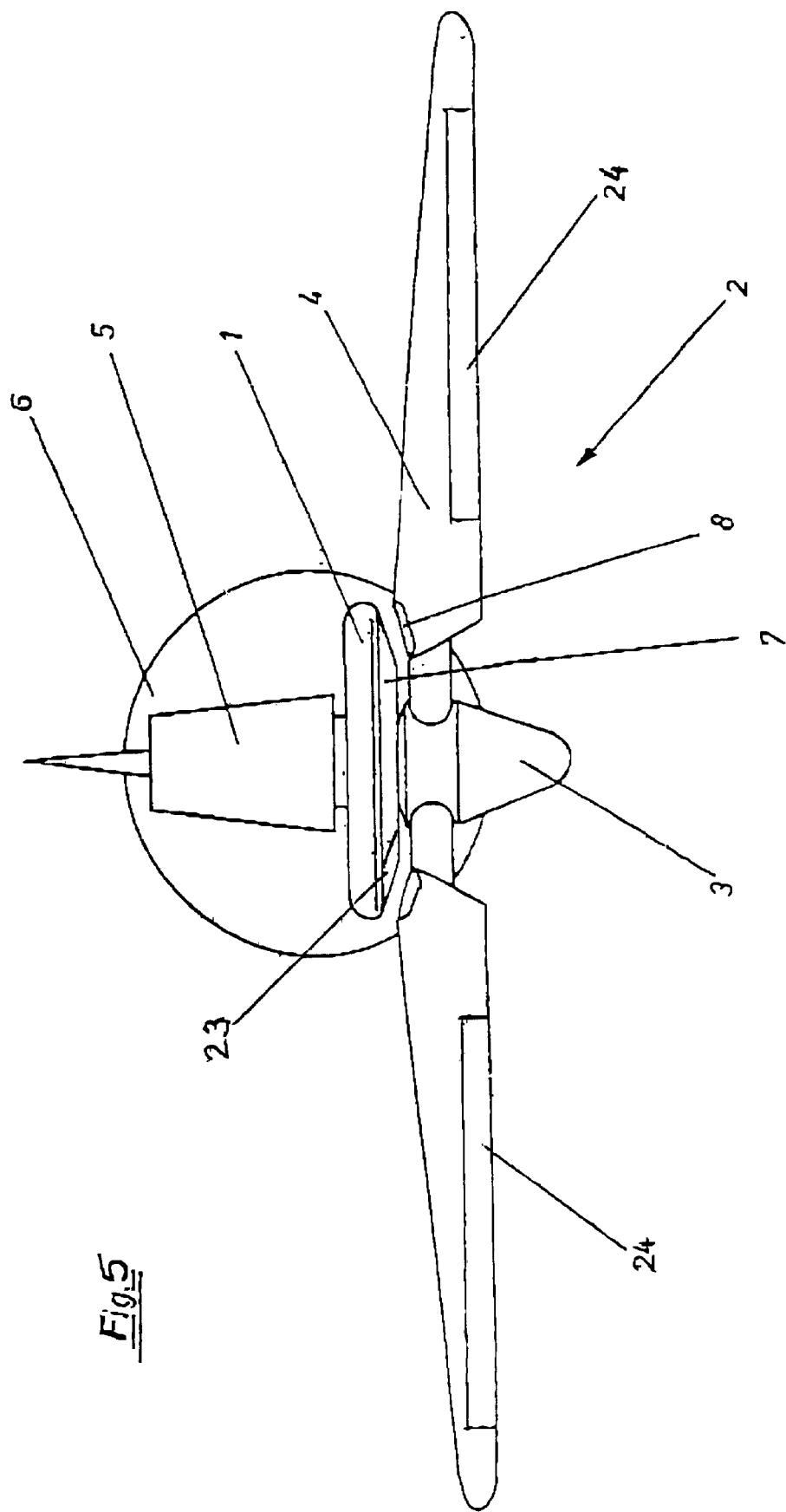
FIG. 5 is a top view of a wind power generating system according to the invention having an advertising area and an image projector.

The obstruction lighting or night marking device also may have a controller for controlling the light source which may, for example, change the color of the light. As shown in FIG. 5, the light source may be able to project images through a projector 23 that are transferable to an advertising space 24 integrated in the rotor blade surface by way of an optical fiber strand. The advertising space would consist of numerous light points. Older wind power generating systems can be retrofitted with the design.

Accordingly, while only a few embodiments of the present invention have been shown and described, it is obvious that many changes and modifications may be made thereunto without departing from the spirit and scope of the invention.

What is claimed is:

1. A wind power generating system with an obstruction lighting or night marking device comprising:

at least one rotor blade allocated to a rotor hub having a hub-side end area, a tip and a rotor blade surface;

at least one optical waveguide on said at least one rotor blade and routed from slid hub-side end area to said rotor blade surface wherein said at least one optical waveguide comprises an optical cable and said optical cable has a bundle of flexible optical fibers, and wherein said optical cable has at least one split point, in which said optical fiber bundle is split into partial optical fiber bundles to said rotor blade surface; and a light source allocated to said at least one optical waveguide in each rotor blade's hub-side end area.

2. The wind power generating system according to claim 1, wherein said at least one optical waveguide is routed through the interior of said at least one rotor blade.

3. The wind power generating system according to claim 1, wherein said at least one split point is disposed at said rotor blade tip.

4. The wind power generating system according to claim 1, wherein a system for influencing the light beams is allocated to each end of said partial optical fiber bundle lying in said rotor blade surface.

5. The wind power generating, system according to claim 4, wherein said system for influencing light beams has at least one mirror.

6. The wind power generating system according to claim 4, wherein said system for influencing light beams has at least one prism.

7. The wind power generating system according to claim 1, wherein said light source is located on non-rotating machine parts of a tower head.

8. The wind power generating system according to claim 1, further comprising a light-absorbing surface disposed in said hub-side end area of each rotor blade and allocated to each optical waveguide, wherein said light-absorbing surface corresponds to said light source.

9. The wind power generating system according to claim 1, wherein said at least one rotor blade has a hollow body profile, which consists of at least one web running in a radial direction, and a belt enveloping said at least one web that exhibits said rotor blase surface.

10. The wind power generating system according to claim 9, wherein said optical cable is routed along the inner surfaces of said hollow body profile.

11. The wind power generating system according to claim 9, wherein said optical cable is integrated into said web or said belt.

12. The wind power generating system according to claim 1, wherein the obstruction lighting or night marking devices have a controller for controlling said light source.

13. The wind power generating system according to claim 12, wherein said light source has a projector for projecting images.

14. The wind power generating system according to claim 1, wherein an advertising area is integrated into the rotor blade surface.

15. The wind power generating system according to claim 14, wherein said advertising area consists of numerous light points.

16. The wind power generating system according to claim 15, wherein at least one optical fiber is allocated to each light point.

* * * * *